(12) United States Patent
Schwager et al.

(10) Patent No.: US 9,356,708 B2
(45) Date of Patent: May 31, 2016

(54) COMMUNICATIONS SYSTEM USING ADAPTIVE FREQUENCY NOTCHING

(71) Applicant: Sony Corporation, Tokyo (JP)

(72) Inventors: Andreas Schwager, Waiblingen (DE); Gerd Spalink, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/633,705

(22) Filed: Feb. 27, 2015

(65) Prior Publication Data

US 2015/0180589 A1 Jun. 25, 2015

Related U.S. Application Data

(63) Continuation of application No. 13/383,089, filed as application No. PCT/EP2010/003981 on Jul. 1, 2010, now Pat. No. 9,001,919.

(30) Foreign Application Priority Data

Jul. 16, 2009 (EP) .................................... 09009295

(51) Int. Cl.
*H04L 1/20* (2006.01)
*H04B 15/00* (2006.01)
(Continued)

(52) U.S. Cl.
CPC ................ *H04B 15/005* (2013.01); *H04B 3/54* (2013.01); *H04B 17/29* (2015.01); *H04L 5/0051* (2013.01);
(Continued)

(58) Field of Classification Search
CPC ........ H04B 15/005; H04B 17/29; H04B 3/54; H04L 25/03828; H04L 27/2626; H04L 25/0226; H04L 5/0051; H04L 27/3411; H04L 25/0204; H04L 5/0048; H04L 5/0023; H04L 27/2605
USPC ......... 375/227, 219, 224, 220, 252, 345, 343, 375/139, 260, 295, 316
See application file for complete search history.

(56) References Cited

U.S. PATENT DOCUMENTS 5,852,630 A * 12/1998 Langberg et al. ............. 375/219
6,426,983 B1 7/2002 Rakib et al.
(Continued)

FOREIGN PATENT DOCUMENTS

CN 1684441 A 10/2005
CN 1762121 A 4/2006
(Continued)

OTHER PUBLICATIONS

ETSI TS 102 578, "PowerLine Telecommunications (PLT); Coexistence between PLT Modems and Short Wave Radio broadcasting services," V1.2.1, pp. 1-16, (Aug. 2008).
(Continued)

*Primary Examiner* — Dhaval Patel
(74) *Attorney, Agent, or Firm* — Oblon, McClelland, Maier & Neustadt, L.L.P.

(57) ABSTRACT

A communications system includes a receiver unit connected with a transmission channel. The receiver unit determines a signal power of a first communications signal received over the transmission channel. A transmitter unit is connected with the transmission channel and transmits a second communications signal, wherein a gain of the communications signal being output by the transmitter unit is controllable. A control unit controls the gain of the transmitter unit in response to the determined signal power. At the receiver unit, detection of broadcast signal ingress during data communication is improved and methods for avoiding disturbances between coexisting communications systems may become more reliable. Different distances between successive training symbols suitable for channel estimation may be provided to enhance the noise measurement.

18 Claims, 11 Drawing Sheets

(51) Int. Cl.
*H04B 3/54* (2006.01)
*H04L 27/34* (2006.01)
*H04L 25/03* (2006.01)
*H04B 17/29* (2015.01)
*H04L 5/00* (2006.01)
*H04L 25/02* (2006.01)
*H04L 27/26* (2006.01)

(52) U.S. Cl.
CPC ...... *H04L 25/0226* (2013.01); *H04L 25/03828* (2013.01); *H04L 27/2626* (2013.01); *H04L 27/3411* (2013.01); *H04L 5/0023* (2013.01); *H04L 5/0048* (2013.01); *H04L 25/0204* (2013.01); *H04L 27/2605* (2013.01)

(56) References Cited

U.S. PATENT DOCUMENTS

| 8,121,202 | B2 | 2/2012 | Koga et al. |
| 8,194,722 | B2 | 6/2012 | Norrell et al. |
| 8,331,428 | B2 | 12/2012 | Suwada |
| 8,737,633 | B2 | 5/2014 | Sibbald et al. |
| 2006/0078044 | A1 | 4/2006 | Norrell et al. |
| 2006/0079191 | A1 | 4/2006 | Parssinen et al. |
| 2007/0081551 | A1 | 4/2007 | Oishi et al. |
| 2007/0254592 | A1 | 11/2007 | McCallister et al. |
| 2007/0274203 | A1* | 11/2007 | Kimura et al. ........ 370/208 |
| 2008/0198952 | A1 | 8/2008 | Stirling-Gallacher |
| 2008/0267319 | A1 | 10/2008 | Shi et al. |
| 2008/0304577 | A1 | 12/2008 | Koga et al. |
| 2010/0195744 | A1 | 8/2010 | Schwager et al. |

FOREIGN PATENT DOCUMENTS

| CN | 1879307 A | 12/2006 |
| EP | 2 020 758 A1 | 2/2009 |
| KR | 20010087690 A1 | 9/2001 |
| WO | WO 2005/117384 A2 | 12/2005 |
| WO | WO 2006/117020 | 11/2006 |
| WO | WO 2009/081185 A1 | 7/2009 |

OTHER PUBLICATIONS

International Search Report Issued Feb. 14, 2011 in PCT/EP10/03981 Filed Jul. 1, 2010.

Combined Chinese Office Action and Search Report issued Dec. 4, 2013 in Patent Application No. 201080031044.0 (with English language translation).

Office Action issued on Feb. 5, 2016 in Korean Patent Application No. 10-2012-7000341.

Office Action issued Feb. 22, 2016 in Chinese Patent Application No. 201410542287.0.

\* cited by examiner

COMMUNICATIONS SYSTEM USING ADAPTIVE FREQUENCY NOTCHING

CROSS-REFERENCE TO RELATED APPLICATIONS

This application is a continuation of U.S. application Ser. No. 13/383,089, filed Feb. 24, 2012, which is a National Stage Application of PCT/EP2010/003981, filed Jul. 1, 2010, which is based upon and claims the benefit of priority from prior European Patent Application No. 09009295.8, filed Jul. 16, 2009. The entire contents of each of which are incorporated herein by reference.

An embodiment of the present invention relates to a communications system using adaptive frequency notching and is directed to the adaptation of the transmit power for facilitating noise measurements during communication. Further embodiments relate to devices for a communications system using adaptive frequency notching and adaptive transmit power management and a method for operating a communications system using adaptive frequency notching and adaptive transmit power management for noise measurements during communication.

BACKGROUND

State of the art PLT (Power Line Telecommunications) may cause coexistence limitations with broadcasting services. The publication ETSI TS 105 578; PowerLine Telecommunications; "Coexistence between PLT modems and short wave radio broadcasting services"; ETSI 2008 describes an adaptive frequency notching technique, which on the one hand has minimum impact on data throughput and QoS (Quality of Service) requirements and, on the other hand reduces interference between PLT (Power Line Telecommunications) and short wave radio broadcast.

Communications and powerline wires act as bidirectional antennas, wherein typically the transfer function or antenna gain is identical for signal radiation and for signal reception. Communications and powerline wires that are suitable for receiving a broadcast signal and that transmit signals in the same frequency band can disturb the reception of the broadcast signal at a radio receiver. Adaptive notching suppresses the use of frequency bands in which broadcast signals are detected by the communications system.

PLT modems detect the presence of broadcast signals by sensing a "noise". The use of the term noise in this application follows the terminology fixed in the ETSI TS 105 578 publication, wherein noise includes radio broadcast signals picked up on the mains cabling. As described in EP 2 020 758 A1, broadcast signals on power lines may be detected, by way of example, by measuring a received signal power in a plurality of narrow frequency bands.

Having identified frequency bands used by receivable radio broadcast signals, the PLT transmitter omits the identified frequency bands by inserting a notch into the transmission spectrum. The notch may be applied by providing suitable notching filters, for example a digital filter with suitable filter coefficients.

WO 2008/101593 A1 describes a transmitting method which is based on a multiple carrier modulation technique and adaptive frequency notching, wherein such carriers are amplified, which are adjacent to the notched frequency bands and which are attenuated by the notching filter.

It is an object of the invention to provide a method and devices for detecting of broadcast signal ingress in communications systems reliably and timely.

The object is achieved by a communications systems according to claim 1, by communications devices adapted for the communications systems as they are claimed in claims 8 and 10 and by a method for operating a communications system as claimed in claim 11. Further embodiments are defined in the dependent claims respectively. Details of the invention will become more apparent from the following description of embodiments in connection with the accompanying drawings.

DETAILED DESCRIPTION

Figure 1A:
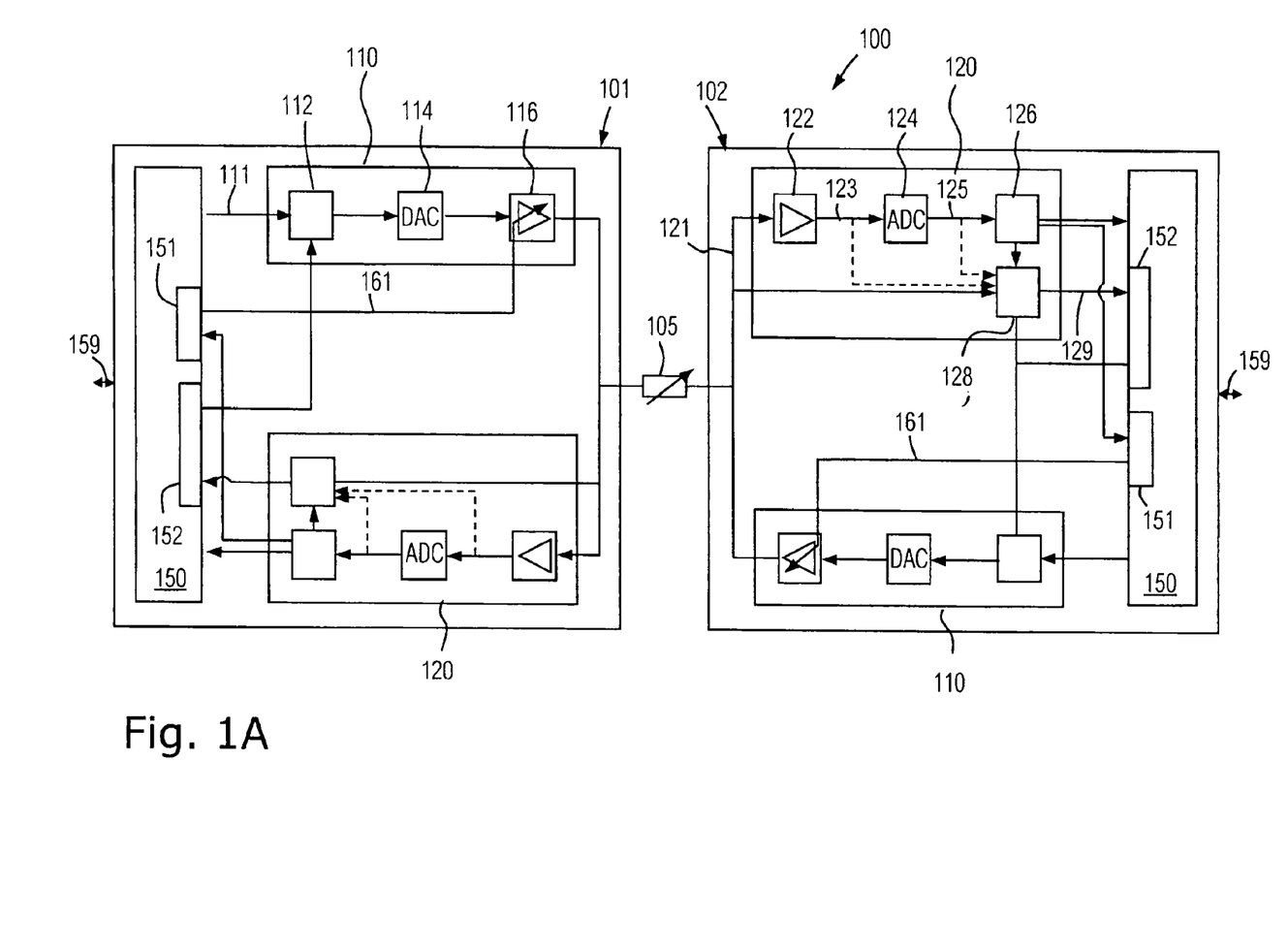
FIG. 1A is a schematic block diagram illustrating a wired or wireless communications system including a receiver unit integrated in a first modem device and a variable gain amplifier transmitter unit integrated in a second modem device in accordance with an embodiment of the invention.

FIG. 1A shows a communications system 100. The communications system 100 may be a wireless or wired communications system, for example xDSL (generic Digital Subscriber Line) or DVB-C2 (Digital Video Broadcasting-Cable). According to an embodiment, the communications system is based on an OFDM (Orthogonal Frequency Division Multiplexing) modulation scheme. In accordance with another embodiment, the communications system 100 is a system using power distribution wires for data communication. For example, the communications system 100 is a power line communications (PLC), mains communications, power line telecommunications (PLT), broadband power line (BPL) or power band or power line networking (PLN) using a modulated carrier superimposed to the 50 or 60 Hz alternating current of the power lines respectively. A transmission line 105 represents a transmission channel between two communications devices of a wired communications system. The communications devices may be a transmitter device and a receiver device or two bidirectional devices (modems).

The communications system 100 includes a first receiver unit 120 which is connected to the transmission line 105. The first receiver unit 120 may include a receive amplifier unit 122 for amplifying a communications signal 121 received over the transmission line 105, an ADC (analogue to digital converter) 124 for sampling the amplified communications signal 123 and a decoder unit 126 for digitally processing (decoding) the sampled communications signal 125. The decoder unit 126 comprises a noise detection unit that is configured to measure noise above a predefined noise level in the communications signal during reception of the communications signal.

The predefined noise level might be defined by a specification of the respective communications system 100. For example, typically communications system 100 have to comply with EMC (electromagnetic compatibility) requirements and therefore noise and signal levels are typically specified which are more or less directly related with either the emission and/or immission side. For example, ETSI defines in ETSI TS 102 578 V1.2.1 (2008-08) a signal level indicating the presence of a radio signal and triggering the omission of the respective frequency band from the transmit spectrum of PLT devices. However, in other scenarios the detection of noise levels (i.e. signals which are weak in relation to the communications signal) may be linked with other requirements.

The first receiver unit 120 may include or may not include an AGC (Automatic Gain Control) for avoiding an amplifier overload or a saturation of the ADC 124. The first receiver unit 120 is configured to determine a signal power of the communications signal 121 received over the transmission line 105.

By way of example, the first receiver unit 120 includes a detection unit 128 which is adapted for evaluating a signal level, for example a signal power level, of the received communications signal 121, and for outputting a control signal 129 which is representative for the signal power of the received communications signal 121. For generating the control signal 129, the detection unit 128 may exclusively evaluate the received communications signal 121 as indicated with the contiguous line, or the amplified communications signal 123, the sampled communications signal 125 or a decoded communications signal as indicated with the dotted lines, or a combination of two or more of these signals. The control signal 129 may describe whether the respective signal exceeds a first predetermined threshold or not.

The communications system 100 further includes a first transmitter unit 110 which is connected to the transmission line 105. The first transmitter unit 110 is configured to transmit a communications signal on the transmission line 105, wherein a gain of the communications signal which is output by the first transmitter unit 110 is controllable. For example, the first transmitter unit 110 includes a transmit coding unit 112, which digitally modulates (codes) a data stream 111 according to a modulation scheme, for example the OFDM (Orthogonal Frequency Division Multiplex) modulation scheme, a DAC (digital analogue converter) 114 for converting the encoded data stream into an analogue signal and a variable gain transmit amplifier unit 116 amplifying the analogue communications signal to generate the communications signal transmitted via the transmission line 105. The gain of the amplifier unit 116 is adjustable.

The communications system 100 further includes a first control unit 151 which is configured to control the gain of the first transmitter unit 110, for example the gain of the transmit amplifier unit 116, in response to the signal level determined at the first receiver unit 120.

The transmission loss of a communications channel for communications systems like PLT has a high variance and is strongly frequency dependent. The average attenuation depends strongly on properties of the wiring, for example, in the case of PLT, on the mains wiring, the influence of various electrical apparatus connected to the mains and the distance between the modems. Therefore, PLT modems typically have a total dynamic range of up to 90 dB, to which on the receiver side the ADC and the AGC of the receiver amplifier contribute.

Typically the transmit amplifier on the transmitter side sends with full power and the AGC on the receiver side prevents overloading the ADC. However, when a strong communications signal is received, noise simultaneously received with the communications signal and radio broadcast signals included in the noise are difficult to detect. According to the embodiments, the transmit amplifier is configured such that its transmission power can be adjusted in such a way that the signal power of the communications signal at the receiver side is sufficiently high for error-free reception of the communications signal and sufficiently low such that an ingress of broadcast signals can be detected when the broadcast signal is sufficiently strong to be receivable by a radio receiver which is arranged in proximity to the communications system.

The transmit amplifier gain and the channel transfer function determine the sensitivity of the receiver unit. According to an example, if a low noise signal of, for example, −95 dBm has to be measured; the sensitivity of the receiver unit has to be set comparatively high. If the transmit amplifier reduces the signal power, the receiver's reception threshold can be set sufficiently low. The embodiments facilitate adaptive power management on the transmitter side and enable reliable noise measurements during data communication at the receiver side.

For example, the publication ETSI TS 105 578 specifies that a powerline communications modem shall detect a radio broadcast signal and activate a corresponding notch in no more than 15 seconds after the receivable radio broadcast service is actually present. ETSI TS 105 578 further defines that a short wave radio broadcast signal is present, if the receivable signal power is at least −95 dBm and at least 14 dB above the noise floor. The notch shall remain active contiguously for the whole time that the short wave radio broadcast is present. A powerline communications system using the receiver unit 120, the transmitter unit 110 and the first control unit 151 according to the embodiments enables PLT devices to reliably measure noise and to quickly detect broadcast signal ingress in a wide range of applications.

FIG. 1A refers to a communications system 100 in which the receiver unit 120 and the transmitter unit 110 are integrated in two different communications devices. The communications system 100 according to FIG. 1A includes a first modem device 101 and a second modem device 102. Each modem device 101, 102 may include a processing unit 150 for processing data received via the transmission line 105, via further data transmission lines 159 or from sensors and for preparing data to be transmitted via the transmission line 105, further data transmission lines 159 or to actuators. The modem devices 101, 102 may be, by way of example, PLT devices with identical interfaces to the transmission line 105, which in this case is provided by the mains.

The second modem device 102 includes the first receiver unit 120, a second control unit 152 and a second transmitter unit 110. The second transmitter unit 110 in the second modem device 102 may or may not be equivalent to the first transmitter unit 110 in the first modem device 101. The second control unit 152 is connected with the first receiver unit 122, for example with the detection unit 128, and the second transmitter unit 110. The second control unit 152 is configured to initiate transmission of a gain control signal over the transmission line 105, when the detected signal level of the received communications signal 121 exceeds a first predetermined threshold level. The second control unit 152 may be a dedicated circuit, for example an ASIC (application specific integrated circuit) or may be integrated in the processing unit 150, and may comprise hardware elements or may be part of a program running in the processing unit 150.

The first modem device 101 includes the first transmitter unit 110, the first control unit 151 and a second receiver unit 120, which may be or which may not be equivalent to the first receiver unit 120 of the second modem device 102. The second receiver unit 120 is connected with the transmission line 105. The first modem device 101 receives the gain control signal over the second receiver unit 120. The first control unit 151 controls the gain of the first transmitter unit 110 in the first modem device 101 in response to the gain control signal received by the second receiver unit 120 of the first modem device 101. The first control unit 151 may be a dedicated circuit, for example an ASIC, or may be integrated in the processing unit 150 of the first modem device 101, and may include hardware elements or may be part of a program running in the processing unit 150.

For example, if the gain control signal indicates that the detected signal level at the first receiver unit 120 in the second modem device 102 exceeds the first predetermined level, the gain at the first transmitter unit 110 in the first modem device 101 is lowered. For example, the gain may be lowered incrementally until no further gain control signal is generated. According to other examples, the gain control signal includes information about the distance of the signal power of the received signal to the first predetermined threshold. Further gain control signals may be generated, when the gain at the transmitter side becomes too low and the communications signal 121 received at the receiver unit 120 in the second modem device 102 can not be evaluated without errors.

Figure 1B:
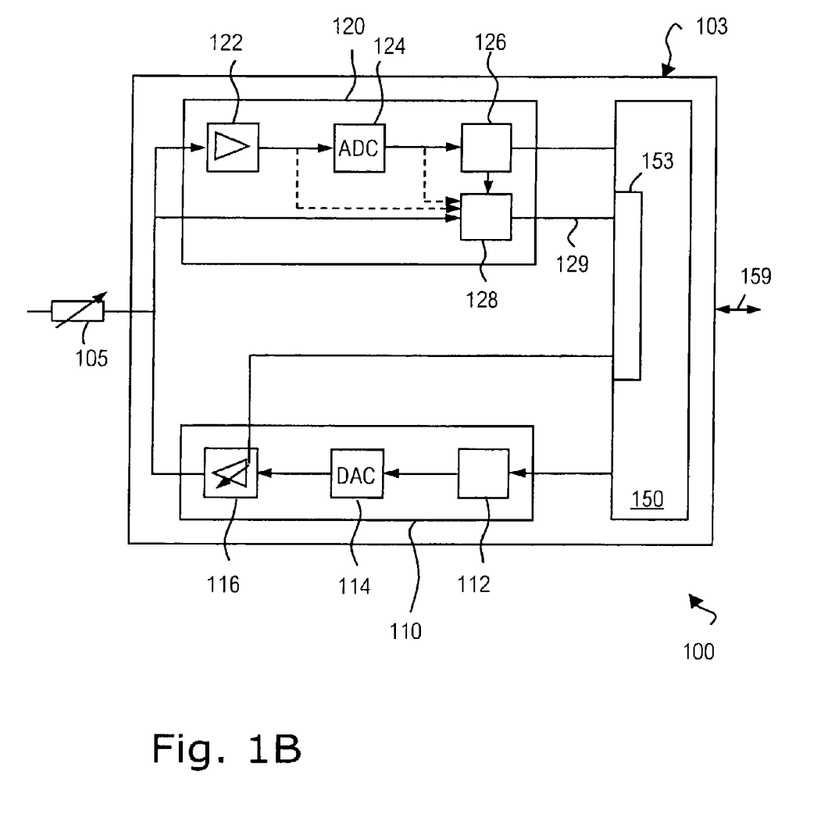
FIG. 1B is a schematic block diagram illustrating a modem device for a wired communications system, wherein a receiver unit and a variable gain amplifier transmitter unit are integrated in the same modem device in accordance with another embodiment of the invention.

FIG. 1B refers to a communications system 100 in which the first receiver unit 120 and the first transmitter unit 110 as described above are integrated in the same modem device 103. The modem device 103 may further include a processing unit 150 for processing data similar to that described with regard to FIG. 1A. The modem device 103 includes a control unit 153 that is connected to the first receiver unit 120, for example to the detection unit 128, and to the first transmitting unit 110.

The control unit 153 is suitable for receiving information about a signal power of a communications signal transmitted by another device in the communications system 100 and received at the first receiver unit 120 of the modem device 103.

The control unit 153 is further configured to adjust the gain of the transmitter unit 116 of the modem device 103. For example, during an initialization period, both devices may transmit with an approximately equal gain and each device adjusts its gain in response to the received signal power. Thereby, the gain is controlled such that the signal power is high enough to ensure safe reception of the communications signal and low enough to facilitate a sufficiently sensitive noise measurement even during simultaneous transmission of a communications signal.

The gain adjustment may be delayed for some communication cycles in order to give the other devices of the communications system the opportunity to detect strong signals and to ramp down the transmit amplifier gains at their sides respectively.

Figure 2:
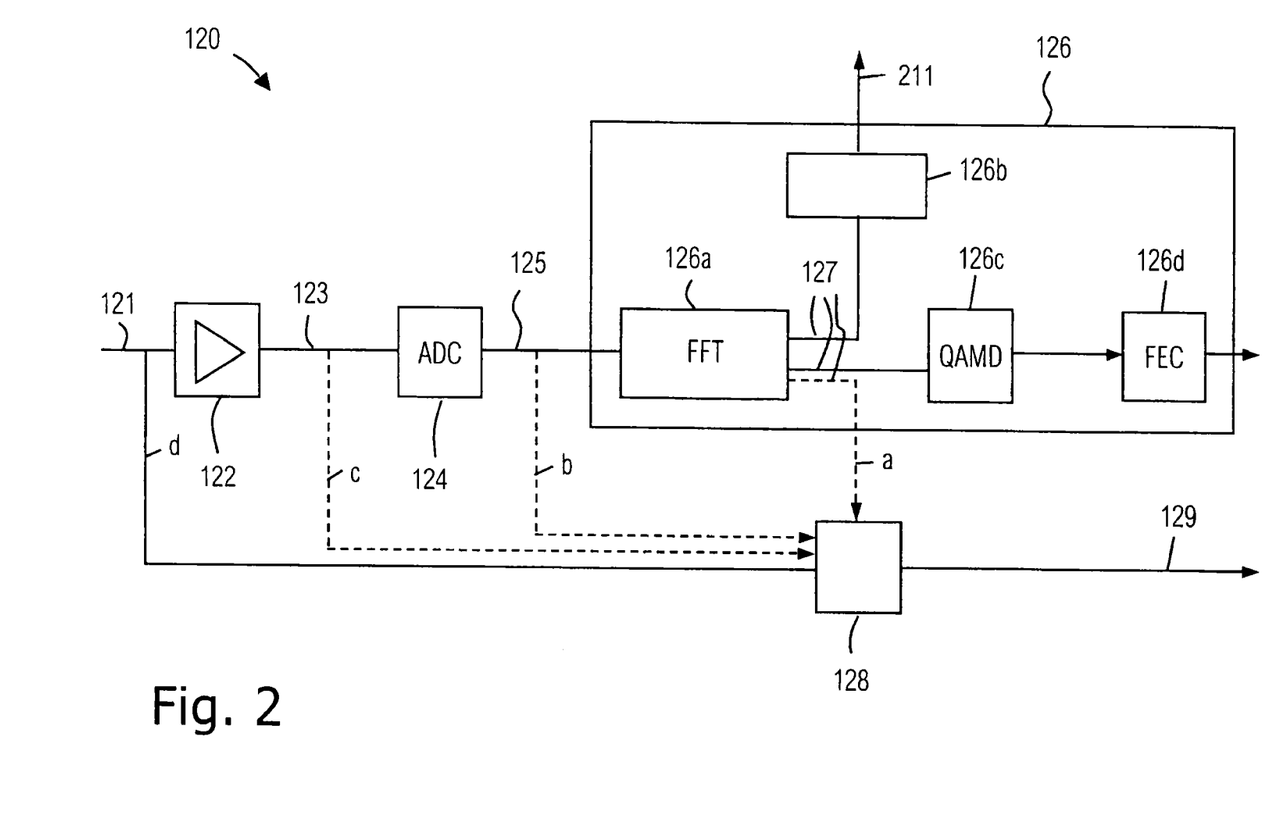
FIG. 2 is a schematic block diagram illustrating a receiver unit including a noise measurement unit in accordance with a further embodiment of the invention.

FIG. 2 illustrates in detail a receiver unit 120 according to an embodiment. In the receiver unit 120 a decoder unit 126 includes a transformation unit 126a, which receives the sampled communications signal 125 and performs a FFT (Fast Fourier Transformation) for obtaining amplitude values for a plurality of frequencies included in the communications signal. The frequency amplitude values represent a spectral description (spectrum) 127 of the sampled communications signal 125.

On the basis of the spectrum 127, a demodulator unit 126c may perform demodulation of the sampled digital signal, for example by using a QAMD (Quadrature Amplitude Modulation Demodulator) in order to obtain a baseband representation of the received communications signal 121. An error correction unit 126d may perform an error correction method on the baseband representation of the received communications signal. The baseband representation may be forwarded to a processing unit. A noise detection unit 126b measures the noise included in the received communications signal, for example on the basis of the spectrum 127. The noise detection unit 126b generates a notch control signal 211 when it detects broadcast signal ingress. The notch control signal 211 contains information about the frequency at which a broadcast signal is detected.

The spectrum 127 may also be used for or may at least contribute to measuring or determining the signal power of the received communications signal in the detection unit 128 as indicated with the doted line a. Alternatively or additionally, the received communications signal 121, the amplified communications signal 123 or the sampled communications signal 125 may be used for determining the signal power of the received communications signal as indicated by line d, line c and line b.

Figure 3:
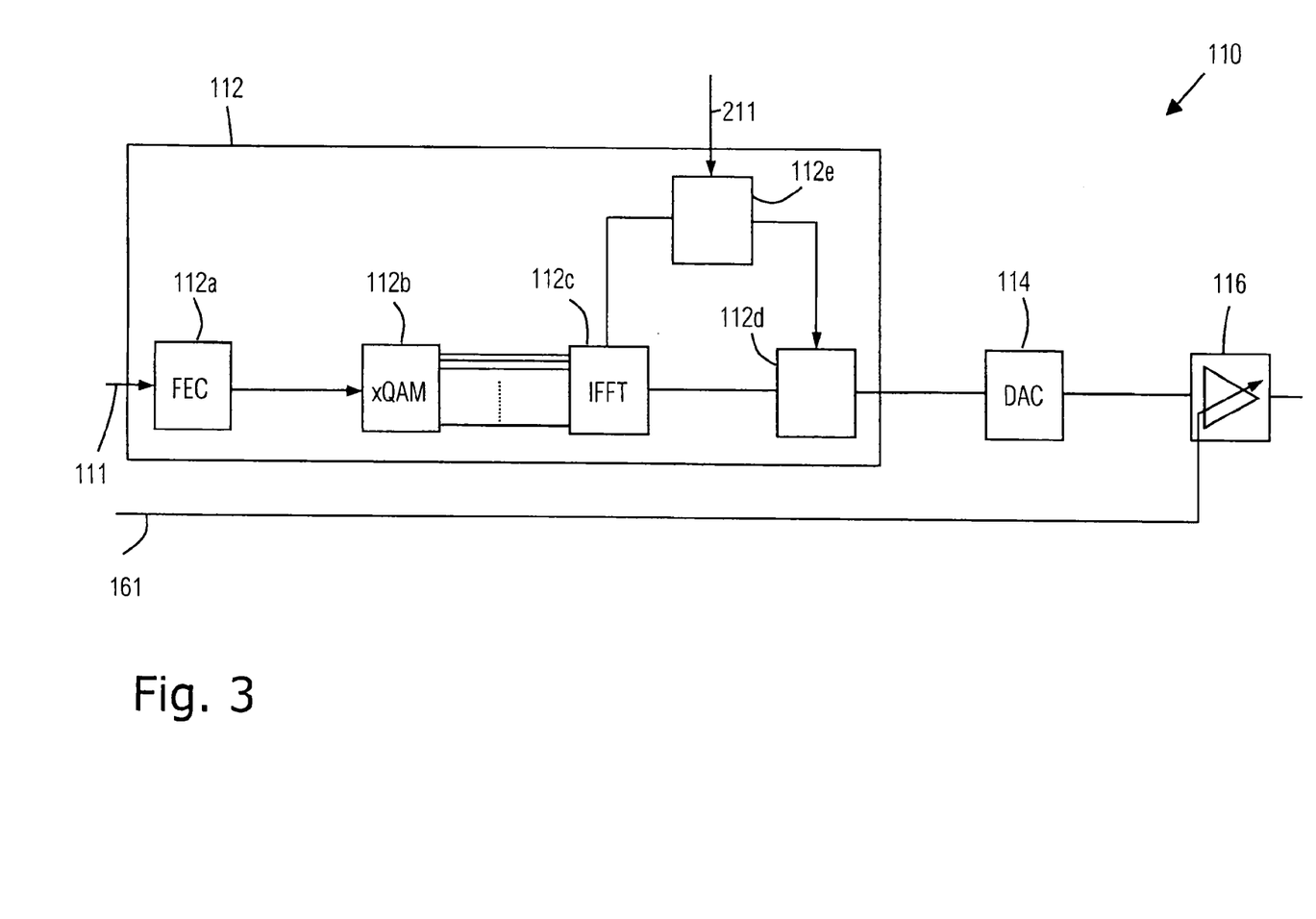
FIG. 3 is a schematic block diagram illustrating a transmitter unit including an adaptive notch filter unit in accordance with a further embodiment of the invention.

FIG. 3 illustrates a transmitter unit 110 in detail. A data stream 111 is transmitted from a processing unit to an error correction unit 112a inserting code redundancy according to an error detection scheme. The resulting data stream is modulated in a modulator unit 112b which may use a plurality of carrier frequencies, for example QAM (quadrature amplitude modulation). Each modulated carrier signal may be weighted with coefficients supplied by a notch control unit 112e. Carriers, which are known to be notched, may already be suppressed at this stage. A transformation unit 112c sums up all non-omitted carriers and applies an IFFT (Inverse Fast Fourier Transformation) to generate a signal in the time domain. The signal may be additionally filtered by a notch unit filter 112d, which may also be controlled by the notch control unit 112e, in order to overcome weak side loop suppression.

The notch filter unit 112d may attenuate frequencies adjacent to the notched frequency band, wherein neighboring carriers may be attenuated, too. This attenuation may be compensated by a pre-amplification of the respective carrier in the transformation unit 112c, which is capable of setting an amplitude of each carrier individually, for example by multiplying each affected carrier with a determined amplitude factor. This multiplication boosts or amplifies the carrier by an amount identical or at least approximately identical to the amount of attenuation of this carrier in the notch filter unit 112d. The value of attenuation for each carrier in the notch filter unit 112d may be derived from the frequency response of the notch filter unit 112d.

The notch control unit 112e is connected with the notch filter unit 112d and the transformation unit 112c. The notch control unit 112e may be configured to set the filter coefficients of the notch filter unit 112d, to calculate the frequency response of the notch filter unit 112d and to boost or amplify attenuated carriers by setting a corresponding amplitude factor in the transformation unit 112c. The notch control unit 112e receives a notch control signal 211 generated, for example, by the noise measuring unit 126b of FIG. 2. According to another embodiment a further measuring unit, which is configured to snoop noise ingress on the transmission channel, may be provided in the input path of the communications device.

Figure 4:
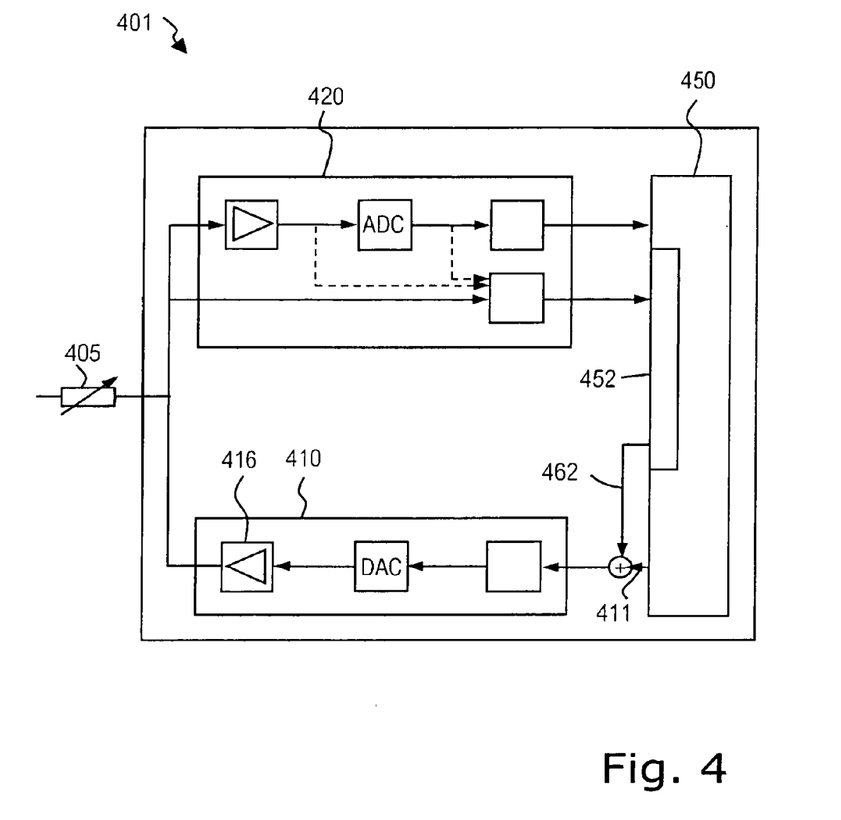
FIG. 4 is a schematic block diagram illustrating a modem device for determining a signal power of a received signal according to an embodiment.

FIG. 4 illustrates a communications device 401 which is configured to detect broadcast signal ingress and to transmit a gain control signal to another communications device which transmits communications signals to the communications device 401. The communications device 401 may participate in a communications system as described with regard to FIG. 1A.

The communications device 401 may be a device for a wired or wireless communications systems. A receiver unit 420 is connectable to a transmission line 405 or to an antenna element. The receiver unit 420 is capable of determining a signal power of a communications signal received over the transmission line 405 or the antenna element and comprises a noise detection unit that is configured to measure noise above a predefined noise level in the communications signal during reception of the communications signal. A transmitter unit 410 is connectable with the transmission line 405 or an antenna element that may be the antenna element used for signal reception. The transmitter unit 410 is configured to transmit a gain control signal over the transmission line 405 or the antenna element. A control unit 452 is connected with the receiver and transmitter units 410, 420. The control unit 452 is capable of initiating transmission of the gain control signal 462, when the signal power of the received communications signal exceeds a first predetermined threshold level. The gain control signal 462 may be inserted into a data stream 411 generated in a process unit 450 of the communications device 401 to be transmitted using the transmitter unit 410. The transmitter unit 410 may be a conventional one with a transmit amplifier unit 416 with fixed gain. The further elements may correspond to the equivalent ones described with respect to the preceding Figures.

In accordance with another embodiment, the gain of the transmitter unit 410, for example the gain of a transmit amplifier unit 416, may be adjustable. Then the receiver unit 420 is further configured to receive a gain control signal and a further control unit may be connected to both the receiver and the transmitter unit 410, 420 and may be configured to control the transmit gain in response to the received gain control signal.

Figure 5:
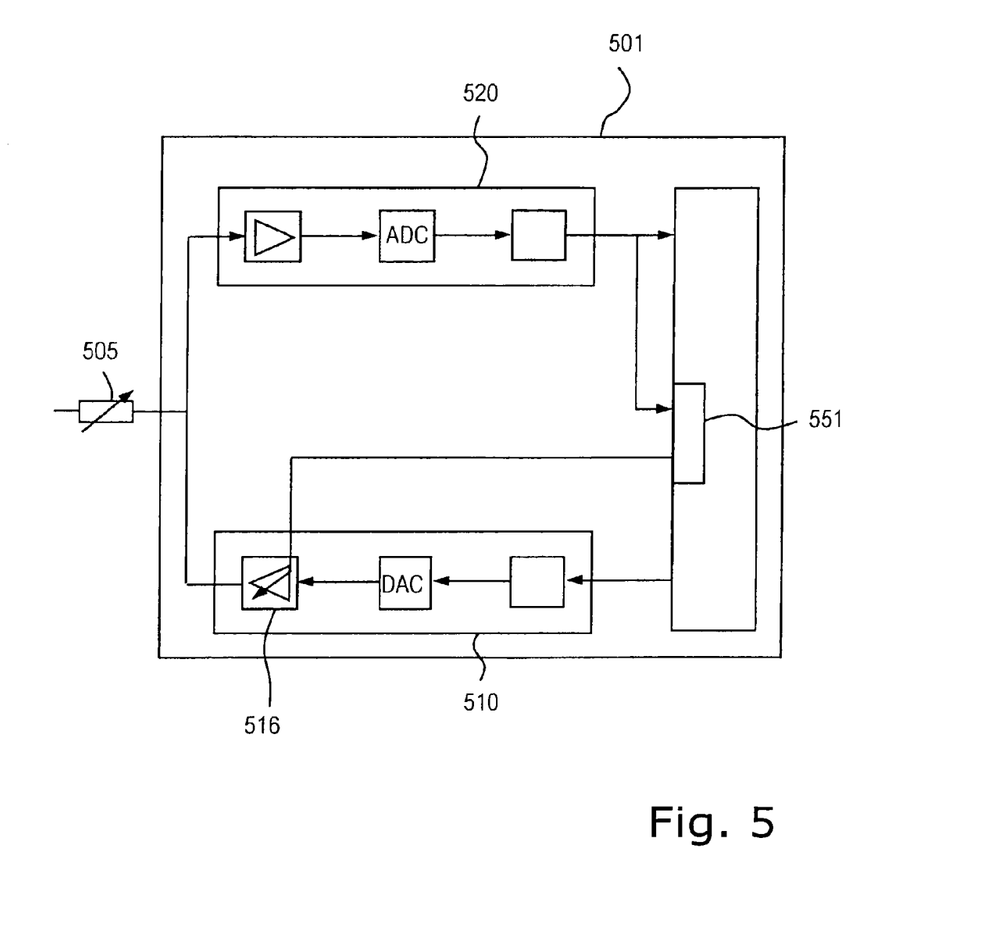
FIG. 5 is a schematic block diagram illustrating a modem device with adjustable transmit gain according to another embodiment.

FIG. 5 illustrates a communications device 501 which is configured to receive a gain control signal and which adjusts its transmit gain in response to the gain control signal.

In accordance with an embodiment, the communications device 501 includes a transmitter unit 510 which gain, for example the gain of a transmit amplifier unit 516, is adjustable. A receiver unit 520 is configured to receive a gain control signal and includes a noise detection unit that is configured to measure noise above a predefined noise level in the communications signal during reception of the communications signal. A control unit 551 is connected to both the receiver and the transmitter units 510, 520 and is capable of controlling the transmit gain in response to the received gain control signal. The further elements may correspond to the equivalent ones described with respect to the preceding Figures.

Figure 6:
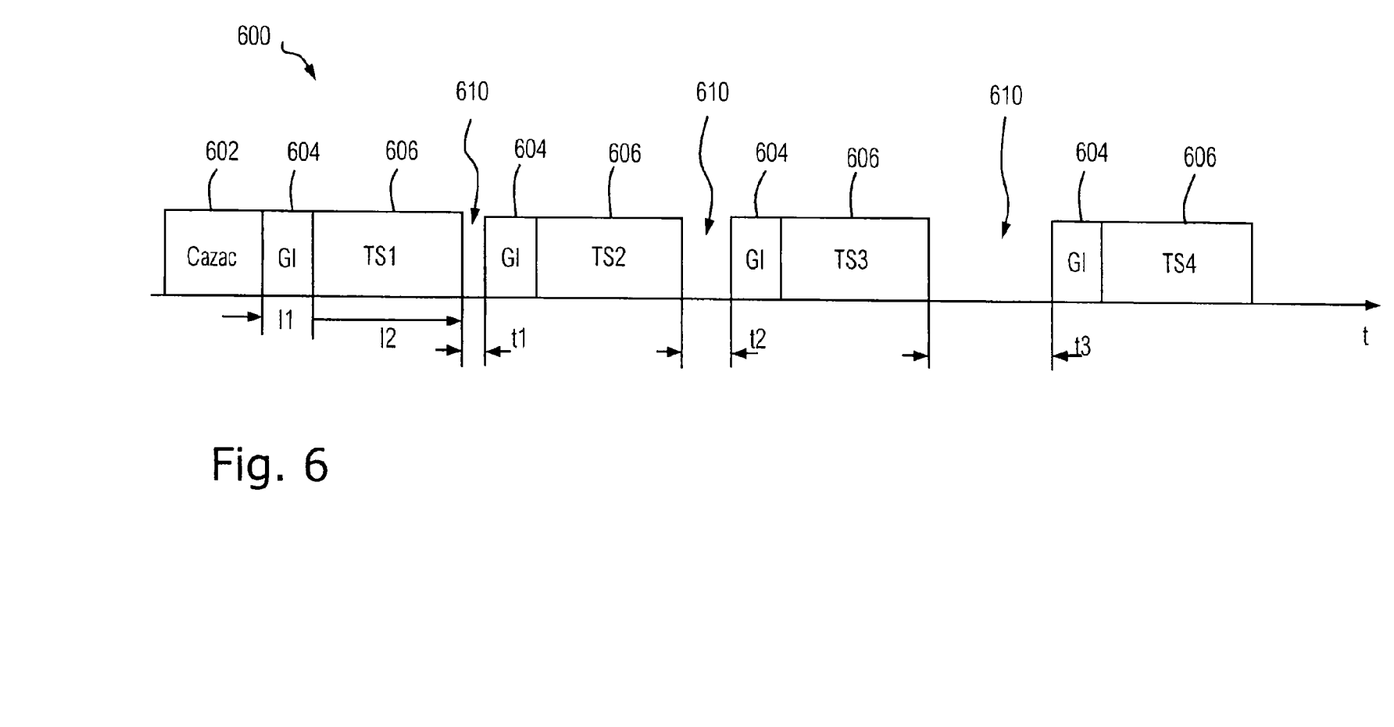
FIG. 6 is a simplified time diagram illustrating a preamble of a communication burst for illustrating features of communications devices according to other embodiments.

FIG. 6 refers to further features of the communications devices 101, 102, 103, 401, 501 as described with reference to FIGS. 1A, 1B, 4 and 5. In accordance with further embodiments, the process unit or the transmitter unit may further be configured to transmit and/or to evaluate received training symbols in the preamble of a communication burst. The training symbols may be used for determining or measuring a channel transfer function of the transmission channel.

In accordance with an embodiment, the process unit includes a channel estimator unit, which is configured to compare received training symbols with reference symbols for determining the channel transfer function of, for example a transmission line between communicating communications devices. The channel transfer function may be used to adapt filters in the transmitter and/or receiver units of the communications devices and to estimate a signal-to-noise ratio. If the noise measurement can be performed during transmission of the preamble, communications resources may be safed. According to an embodiment, noise measurement is performed by evaluating the variance between the received training symbols.

FIG. 6 schematically shows a preamble 600 of a communication burst. At the head of the preamble, a synchronization sequence 602 may be provided which may be used for time synchronization of the receiving device. Then a plurality of training symbols 606 may follow, wherein each training symbol 606 may be headed by a guard interval 604, which may be provided to make the transmission robust versus multipath transmissions. The guard intervals 604 may contain copies of segments of the training symbols 606, by way of example. Each guard interval 604 may have a first length 11 and each training symbol 606 may have a second length 12. In accordance with an embodiment, each subsequent guard interval 604 directly follows the preceding training symbol 606. However, noise frequencies at multiples of the training symbol repetition rate may be difficult to detect, because such noise does not increase the variance between the received training symbols 606.

In accordance with another embodiment, the guard interval 604 may differ with regard to the length. For example, each guard interval 604 has another length. In accordance with other embodiments, additional gaps 610 of different length may be inserted between each training symbol 606 and the successive guard interval 604. During the gaps 610, no signal is transmitted. This avoids any constant sine wave interferer with a frequency of a multiple of the training symbol repetition frequency, which could influence each training symbol 606 in the same way. The distance between the training symbols 606 may be altered such that as few signals as possible can influence all training symbols 606 in the same way. A variation of gap length may be combined with a variation of the length (duration) of the guard intervals (604). According to other embodiments, additionally or alternatively, the length of the training symbols (606) may be varied.

If a noise measurement is performed during an active state of the communications, it is possible to use payload data symbols instead of predetermined training symbols by transmitting successive payload data symbols at different temporary distances to each other.

According to a further embodiment, alternatively or additionally the noise is measured during a quiet state of the communication, for example in communication pauses during which no communications signal is transmitted or in predefined communication frames as explained in detail with reference to FIG. 7.

Figure 7:
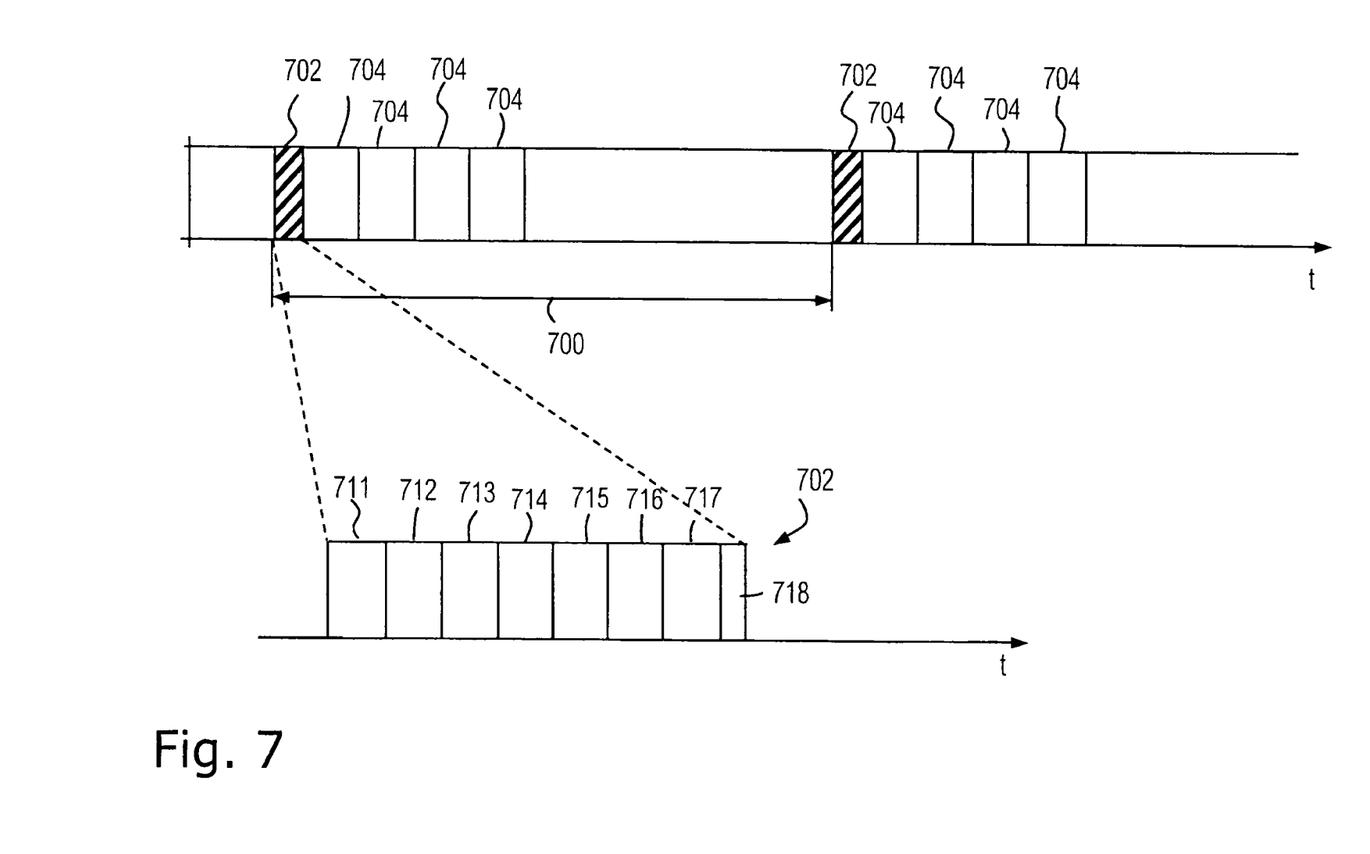
FIG. 7 is a simplified time diagram illustrating a synchronization period for illustrating features of communications devices according to other embodiments.

FIG. 7 shows a frame for synchronizing a communications system which may comprise a plurality of similar or different PLT systems available from different manufacturers. An in-home synchronization period 760 is aligned to the AC line cycle, wherein time slots contained in the in-home synchronization period 760 have a specified timing relative to the zero crossings of the AC line cycle. The in-home synchronization period 760 contains a synchronization signal 762 which includes information for allocating time domain units 764 to the participating PLT systems or modems. The synchronization signal 762 may be detected with a correlation function at the receiver side and does not necessarily pass the specific demodulation and error correction path at the receiver unit of the respective PLT modem. The synchronization signal 762 may contain several additional sub-slots 771-778 for system organization. Not all sub-slots 771-778 are used. For example an r-sync field 774 is rarely used. According to an embodiment, the r-sync field 774 is used for a noise measurement and for the detection of broadcast signal ingress alternatively to or in addition with the noise measurement during communication. Each participating system relays on that none of the participants uses the r-sync field 774. If it is used, all systems notice it and withdraw their last noise measurement relaying on the non-use of the r-sync field 774.

Figure 8A:
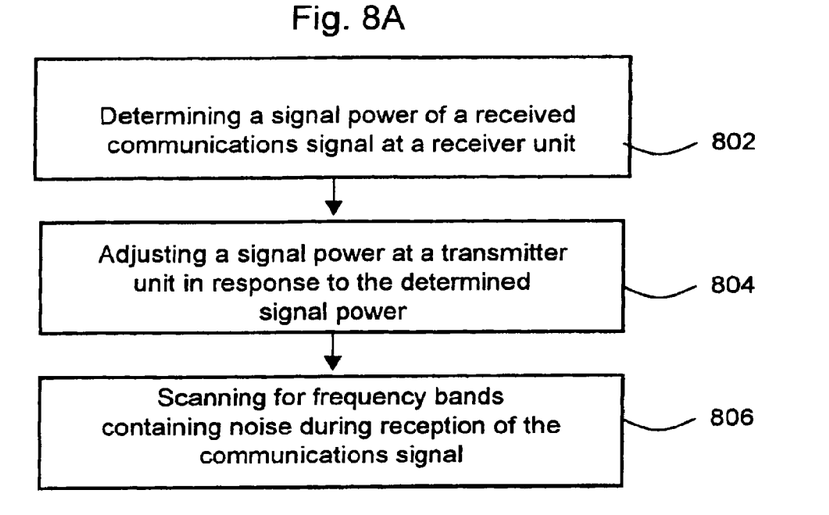
FIG. 8A is a simplified flow chart of a method for operating a communications system in accordance with a further embodiment.

FIG. 8A is a simplified flow chart illustrating a method of operating a communications system as described above and which may include two or more communications devices as described above. At a receiver unit a signal power of a received communications signal is determined (802). At a transmitter unit, a transmit gain is adjusted in response to the determined signal power (804). Then, during the transmission of communications signals, a receiver frequency range is scanned for frequency bands containing noise at the receiver unit (806).

Figure 8B:
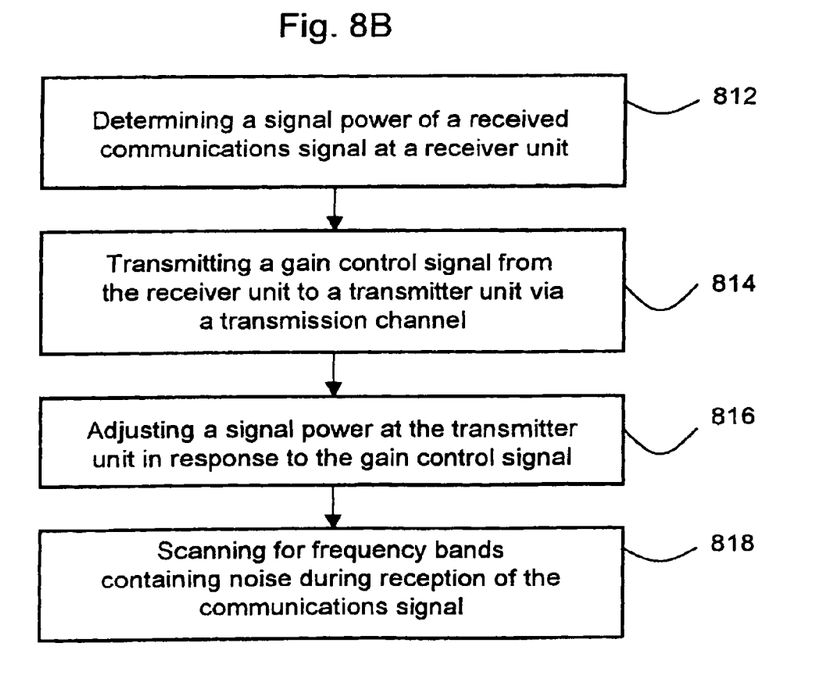
FIG. 8B is a simplified flow chart of a method for operating a communications system in accordance with a further embodiment referring to mutual gain adjustment.

According to an embodiment illustrated in FIG. 8B, a signal power of a received communications signal is determined (812) and a gain control signal is generated and transmitted over a transmission channel, if the signal power exceeds a predetermined threshold (814). At the transmitter unit a transmit gain is adjusted in response to the gain control signal (816). Then, during the transmission of communications signals, a receiver frequency range is scanned for frequency bands containing noise at the receiver unit (818).

The transmitter unit and the receiver unit may be integrated in the same communications device or may be assigned to two different communications devices, wherein the gain control signal is transmitted from a first communications device containing the receiver unit to a second communications device containing the transmitter unit.

In accordance with an embodiment, the transmit gain is adjusted such that a signal power of the communications signal at the receiver unit facilitates the detection of broadcast signals which are receivable by radio receivers arranged in the proximity of the communications system. For example, the transmit gain may be adjusted such that the receiver unit is just capable of detecting the presence of radio broadcast signals, for example short wave radio broadcast signals, that ingress with at least −95 dBm to the mains.

After adjustment of the transmit gain, noise measurements can be performed during communication, i.e. simultaneously with the transmission of communications signals. The noise measurements may include the detection of present broadcast signals and the detection of the frequency bands associated to the broadcast signals. Even if the channel attenuation is very low, the receiver gain can be set low enough to ensure sufficient sensitivity for noise measurements, for example to detect low signals of a signal level of −95 dBm even during communication. No quiet times with suspended communication are required. In addition, the broadcast signals may be detected timely after the receivable radio broadcast signal is actually present.

According to an embodiment, the receiver unit scans a receiver frequency range for a frequency band containing noise above a predetermined noise level during simultaneous reception of a communications signal. When the receiver unit detects the presence of a broadcast signal in the received signal, the receiver unit may generate a notch control signal identifying the occupied frequency bands. The notch control signal may be transmitted to a notch control unit controlling a notch filter unit and/or a transformation unit in a transmitter unit.

In accordance with an embodiment, the receiver frequency range is scanned during transmission of a communications signal preamble containing predetermined training symbols suitable for channel estimation. According to an embodiment, successive training symbols are transmitted with different temporary distances to each other.

After the radio broadcast service has been identified as no longer receivable, the notch may still remain active for a predetermined time period, for example for at least 180 seconds. Other than for the detection of a radio broadcast signal, where the PLT modem can be assume that there is no radio broadcast service available and may use the respective frequency, a potential reuse of a notched frequency must be checked without using the notched frequency such that the radio broadcast service is not interfered by the measuring process.

Therefore, in accordance with further embodiments, the method may further comprise checking, during communication pauses with no communications signals being transmitted, whether in notched frequency bands the noise level falls below a second predetermined threshold that may be equal to the first predetermined threshold or lower. When the noise level in a notched frequency band falls below the second predetermined threshold, the suppression of the frequency components in the range of the notch frequency band can be deactivated such that these frequency bands are again available for the communication in the communications system.

Figure 8C:
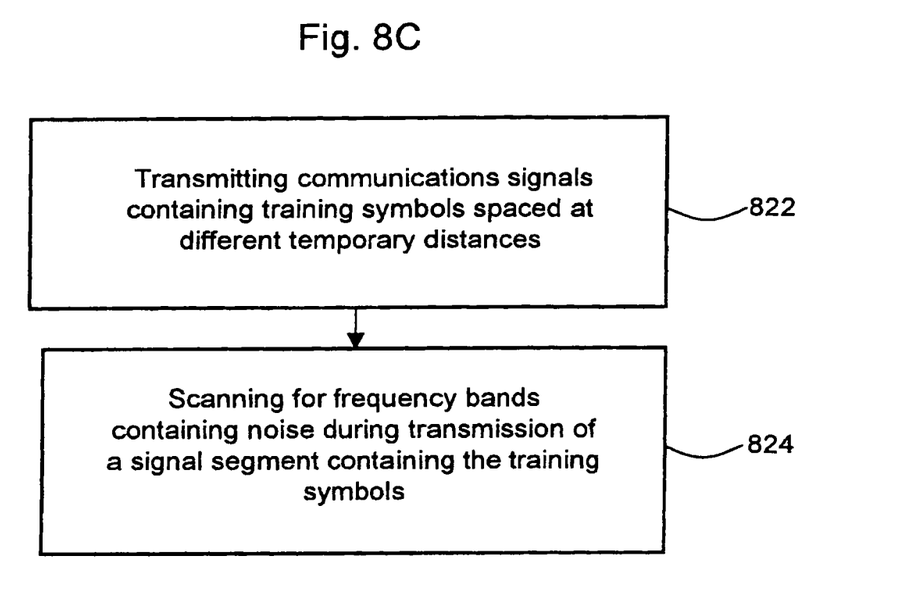
FIG. 8C is a simplified flow chart of a method for operating a communications system in accordance with a further embodiment using varying distances between training symbols.

According to an embodiment illustrated in FIG. 8C, a communications signal including predetermined training symbols suitable for channel estimation is transmitted from a first to a second communications device, wherein successive training symbols are transmitted at different temporary distances to each other (822). At the second communications device and during simultaneous reception of the predetermined training symbols, a receiver frequency range is scanned for a notch frequency band containing noise above a predetermined noise level given by a specification of the communications system (824).

If a noise measurement is performed during a period of time when payload data is transmitted from the first communications device to the second communications device, it is also possible to use payload data symbols in the same way as the predetermined training symbol, i.e. successive payload data symbols are transmitted at different temporary distances to each other. Therefore, at the second communications device and during simultaneous reception of the payload data symbols, a receiver frequency range is scanned for a notch frequency band containing noise above a predetermined noise level given by a specification of the communications system (824).

Figure 9:
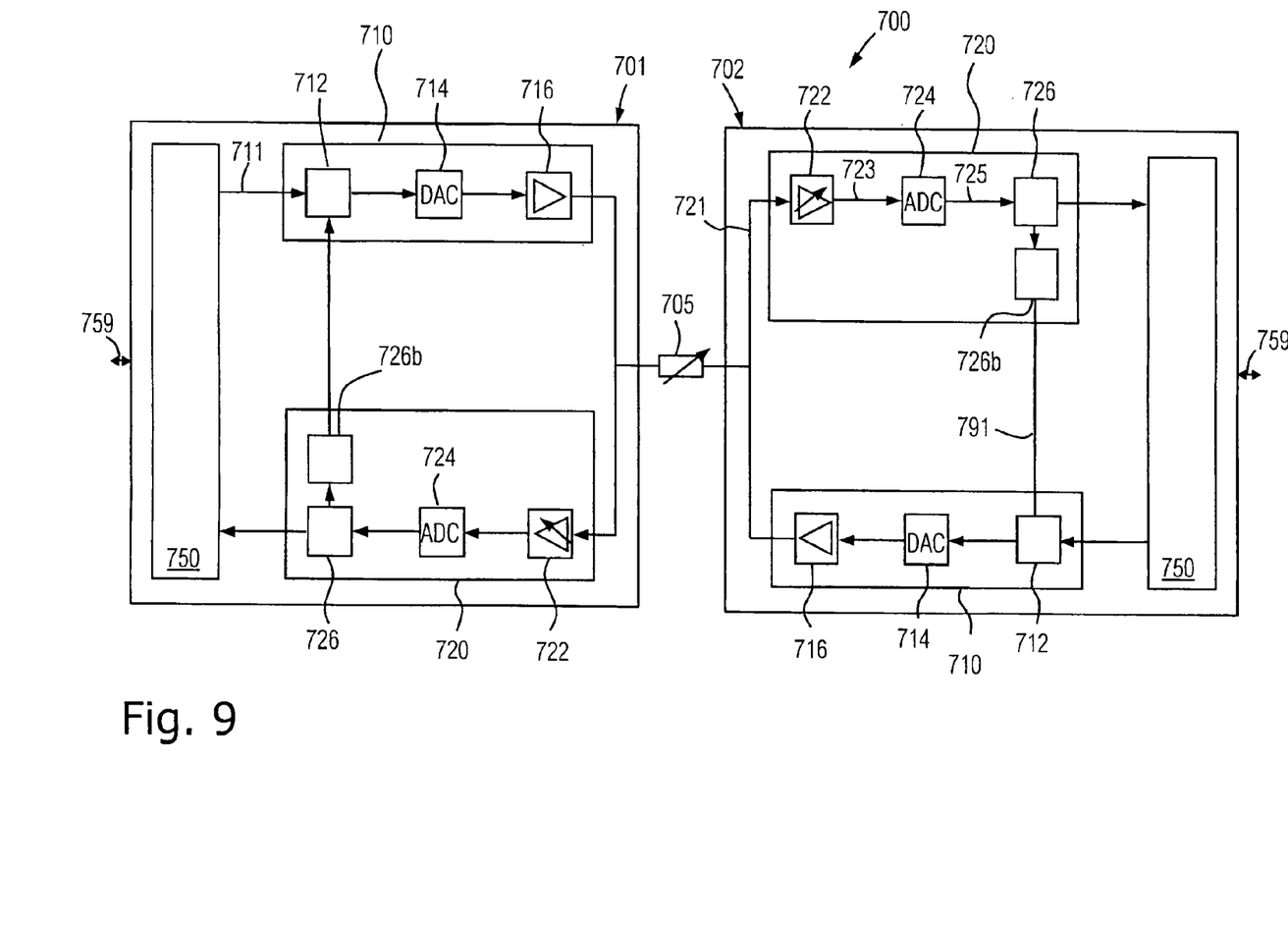
FIG. 9 is a schematic block diagram illustrating a wired or wireless communications system using training symbols for channel estimation.

FIG. 9 refers to a communications system 700 using different distances between successive known symbols or signal contents in the communications signal. A first communications device 701 is capable of transmitting a communications signal. The communication signal contains predetermined signal contents, which form and appearance is known to the second communication device 701. The predetermined signal symbols may be, by way of example, training symbols 606 suitable for channel estimation. In accordance with the illustrated embodiment, the first communication device 701 is capable of transmitting successive training symbols 606 at different temporary distances to each other. With regard to the timing of the training symbols, reference is made here to FIG. 6 and the pertinent description.

A second communications device 702 is capable of receiving the communications signal and of scanning, during simultaneous reception of the communications signal, a receiver frequency range for a notch frequency band containing noise above a predetermined noise level given by a specification of the communications system 700, wherein the receiver frequency range is scanned during transmission of the known predetermined symbols of signal contents, for example a segment including the training symbols 606.

The communications system 700 may be a wireless or wired communications system, for example xDSL (generic Digital Subscriber Line) or DVB-C2 (Digital Video Broadcasting-Cable). According to an embodiment, the communications system is based on an OFDM (Orthogonal Frequency Division Multiplexing) or wavelet transformation modulation scheme. In accordance with another embodiment, the communications system 700 is a system using power distribution wires for data communication. For example, the communications system 700 is a power line communications (PLC), mains communications, power line telecommunications (PLT), broadband power line (BPL) or power band or power line networking (PLN) using a modulated carrier superimposed to the 50 or 60 Hz alternating current of the power lines respectively. A transmission line 705 represents a transmission channel between two communications devices of a wired communications system. The communications devices may be a transmitter device and a receiver device or two bidirectional devices (modems).

At least the second communications device 702 includes a receiver unit 720 which is connected to the transmission line 705. The receiver unit 720 may include a receive amplifier unit 722 for amplifying the communications signal 721 received over the transmission line 705, an ADC (analogue to digital converter) 724 for sampling the amplified communications signal 723 and a decoder unit 726 for digitally processing (decoding) the sampled communications signal 725. The receiver unit 720 may include or may not include an AGC (Automatic Gain Control) for avoiding an amplifier overload or a saturation of the ADC 724. The ADC 724 may be a high dynamic range converter, for example a 16 bit ADC.

At least the first communications device 701 includes a transmitter unit 710, which is connected to the transmission line 705. The transmitter unit 710 is configured to transmit the communications signal on the transmission line 705. The transmitter unit 710 may include a transmit coding unit 712, which digitally modulates (codes) a data stream 711 according to a modulation scheme, for example the OFDM (Orthogonal Frequency Division Multiplex) modulation scheme, a DAC (digital analogue converter) 714 for converting the encoded data stream into an analogue signal and a transmit amplifier unit 716 amplifying the analogue communications signal to generate the communications signal transmitted via the transmission line 705. The gain of the amplifier unit 716 may or may not be adjustable.

Each communications device 701, 702 may include a processing unit 750 for processing data received via the transmission line 705, via further data transmission lines 759 or from sensors and for preparing data to be transmitted via the transmission line 705, further data transmission lines 759 or to actuators. The communications devices 701, 702 may be, by way of example, PLT devices with identical interfaces to the transmission line 705, which in this case is provided by the mains.

The transmitter, receiver, and processing units 710, 720, 750 of both communications device 701, 702 may or may not be equivalent to each other respectively The receiver unit 720 may contain a decoder unit including a transformation unit, which receives the sampled communications signal 725 and which performs a FFT for obtaining amplitude values for a plurality of frequencies included in the communications signal. The frequency amplitude values represent a spectral description of the sampled communications signal 725.

On the basis of the spectrum, a demodulator unit may perform demodulation of the sampled digital signal, for example by using a QAM Demodulator in order to obtain a baseband representation of the received communications signal 721. An error correction unit may perform an error correction method on the baseband representation of the received communications signal. The baseband representation may be forwarded to the processing unit 750. A noise detection unit 726b measures the noise included in the received communications signal, for example on the basis of the spectrum. The noise detection unit 726b generates a notch control signal 791 when it detects broadcast signal ingress. The notch control signal 791 contains information about the frequency at which a radio broadcast signal is detected.

The transmitter units 710 may contain an error correction unit inserting code redundancy according to an error detection scheme and a modulator unit modulating the resulting data stream, wherein the modulator unit may use a plurality of carrier frequencies, for example QAM. Each modulated carrier signal may be weighted with coefficients supplied by a notch control unit. Carriers, which are known to be notched, may already be suppressed at this stage. A transformation unit may sum up all non-omitted carriers and may apply an IFFT to generate a signal in the time domain. The signal may be additionally filtered by a notch unit filter, which may also be controlled by the notch control unit, in order to overcome weak side loop suppression. The notch control unit may receive a notch control signal 791 generated, for example, by a noise measuring unit 726b in the receiver unit 720.

As it has been explained above, it is also possible to use payload data symbols instead of predetermined training symbols, if a noise measurement is performed in a period of time, by transmitting successive payload data symbols at different temporary distances to each other.

The features of the communications system 700 may be further combined with features of the embodiments as described with regard to the preceding Figures, without those elements dedicated to adaptive power management.

The invention claimed is:

1. A method of operating a communication system, comprising:
   transmitting, from a first communication device to a second communication device, a communication signal including a plurality of predetermined training symbols to estimate a channel; and
   scanning, at the second communication device and during simultaneous reception of the communication signal, a receiver frequency range for a notch frequency band containing noise above a predetermined noise level, wherein the receiver frequency range is scanned during transmission of the plurality of predetermined training symbols, successive predetermined training symbols in the plurality of predetermined training symbols are transmitted at different temporary distances to each other, each predetermined training symbol including a guard interval, and a length of each guard interval of each predetermined training symbol differs from a length of each guard interval of each other predetermined training symbol in the plurality of predetermined training symbols.

2. The method according to claim 1, wherein each predetermined training symbol is headed by the guard interval corresponding thereto.

3. The method according to claim 1, wherein the predetermined training symbols are included in a preamble of the communication signal.

4. The method according to claim 1, wherein a guard interval includes segments of a predetermined training symbol corresponding thereto.

5. The method according to claim 1, further comprising adjusting a power of the communication signal to facilitate measurement of noise having a predetermined level.

6. The method according to claim 5, wherein the power of the communication signal is maintained at or above a predetermined level to permit reception of the communication signal by the second communication device.

7. A non-transitory computer-readable medium encoded with computer-readable instructions that, when executed by a computer, cause the computer to perform a method comprising:

transmitting, from a first communication device to a second communication device, a communication signal including a plurality of predetermined training symbols to estimate a channel; and scanning, at the second communication device and during simultaneous reception of the communication signal, a receiver frequency range for a notch frequency band containing noise above a predetermined noise level, wherein the receiver frequency range is scanned during transmission of the plurality of predetermined training symbols, successive predetermined training symbols in the plurality of predetermined training symbols are transmitted at different temporary distances to each other, each predetermined training symbol includes a guard interval, and a length of each guard interval of each predetermined training symbol differs from a length of each guard interval of each other predetermined training symbol in the plurality of predetermined training symbols.

8. The non-transitory computer-readable medium according to claim 7, wherein each predetermined training symbol is headed by the guard interval corresponding thereto.

9. The non-transitory computer-readable medium according to claim 7, wherein the predetermined training symbols are included in a preamble of the communication signal.

10. The non-transitory computer-readable medium according to claim 7, wherein a guard interval includes segments of a predetermined training symbol corresponding thereto.

11. The non-transitory computer-readable medium according to claim 7, further comprising adjusting a power of the communication signal to facilitate measurement of noise having a predetermined level.

12. The non-transitory computer-readable medium according to claim 11, wherein the power of the communication signal is maintained at or above a predetermined level to permit reception of the communication signal by the second communication device.

13. A communication system, comprising:

a first communication device including circuitry configured to transmit a communication signal including a plurality of predetermined training symbols to estimate a channel; and a second communication device including circuitry configured to scan, during simultaneous reception of the communication signal, a receiver frequency range for a notch frequency band containing noise above a predetermined noise level, wherein the receiver frequency range is scanned during transmission of the plurality of predetermined training symbols, successive predetermined training symbols of the plurality of predetermined training symbols are transmitted at different temporary distances to each other, each predetermined training symbol includes a guard interval, and a length of each guard interval of each predetermined training symbol differs from a length of each guard interval of each other predetermined training symbol in the plurality of predetermined training symbols.

14. The communication system according to claim 13, wherein each predetermined training symbol is headed by the guard interval corresponding thereto.

15. The communication system according to claim 13, wherein the predetermined training symbols are included in a preamble of the communication signal.

16. The communication system according to claim 13, wherein a guard interval includes segments of a predetermined training symbol corresponding thereto.

17. The communication system according to claim 13, wherein the circuitry of the first communication device adjusts a power of the communication signal to facilitate measurement of noise having a predetermined level.

18. The communication system according to claim 17, wherein the power of the communication signal is maintained at or above a predetermined level to permit reception of the communication signal by the second communication device.

* * * * *